(12) United States Patent
Huang et al.

(10) Patent No.: US 11,275,191 B2
(45) Date of Patent: Mar. 15, 2022

(54) METHOD AND SYSTEM OF MAGNETOTELLURIC SYNCHRONOUS DETECTION AND REAL-TIME INVERSION

(71) Applicant: Hunan University of Science and Technology, Hunan (CN)

(72) Inventors: Cailun Huang, Hunan (CN); Jing Wang, Hunan (CN); Yongjun Tian, Hunan (CN); Kai Sun, Hunan (CN); Li Ouyang, Hunan (CN); Kaixuan Zhang, Hunan (CN); Xiongsheng Yi, Hunan (CN)

(73) Assignee: Hunan University of Science and Technology, Xiangtan (CN)

( * ) Notice: Subject to any disclaimer, the term of this patent is extended or adjusted under 35 U.S.C. 154(b) by 617 days.

(21) Appl. No.: 16/226,611

(22) Filed: Dec. 19, 2018

(65) Prior Publication Data

US 2019/0196040 A1 Jun. 27, 2019

(30) Foreign Application Priority Data

Dec. 25, 2017 (CN) .......................... 201711420785.8

(51) Int. Cl.
*G01V 1/36* (2006.01)
*G01V 1/28* (2006.01)
(Continued)

(52) U.S. Cl.
CPC .............. *G01V 1/364* (2013.01); *G01V 1/282* (2013.01); *G01V 1/48* (2013.01); *G01V 3/08* (2013.01); *G01V 3/12* (2013.01); *G01V 3/38* (2013.01)

(58) Field of Classification Search
CPC .......... G01V 1/364; G01V 1/282; G01V 1/48; G01V 3/08; G01V 3/12; G01V 3/38
See application file for complete search history.

(56) References Cited

U.S. PATENT DOCUMENTS 6,191,587 B1 * 2/2001 Fox ........................ G01V 3/082
324/345
8,836,336 B2 * 9/2014 Campbell ................ G01V 3/12
324/365

(Continued)

FOREIGN PATENT DOCUMENTS

CN 102721982 B 8/2014
CN 104375191 A 2/2015
(Continued)

*Primary Examiner* — Alexander Satanovsky
*Assistant Examiner* — Lynda Dinh (57) ABSTRACT

Disclosed are a method and system of magnetotelluric synchronous detection and real-time inversion. The system includes a detection and inversion host (M) with wireless networking function and $N^2-1$ detection and inversion extensions $(S_i)$ with wireless communication functions. The distance between each two detection and inversion extensions $(S_i)$ is D, i=1, 2, . . . , $N^2-1$, and N is an odd number. The detection and inversion host is configured for collecting magnetic field signals and electric field signals at measurement points, wireless networking and cooperation, synchronous detection and real-time inversion control of the detection and inversion extensions $(S_i)$ in detection area. The detection and inversion extensions $(S_i)$ are configured for synchronous collection of electric field signals at measurement points and real-time inversion of detection data at measurement points under cooperative control of the detection and inversion host.

4 Claims, 3 Drawing Sheets (51) Int. Cl.
*G01V 1/48* (2006.01)
*G01V 3/12* (2006.01)
*G01V 3/08* (2006.01)
*G01V 3/38* (2006.01)

(56) References Cited

U.S. PATENT DOCUMENTS

| | | | |
|---|---|---|---|
| 8,923,094 B2* | 12/2014 | Jing | G01V 1/288 367/73 |
| 9,195,783 B2* | 11/2015 | Mullur | G01V 3/12 |
| 2010/0014384 A1* | 1/2010 | Colombo | G01V 1/303 367/73 |
| 2016/0086079 A1* | 3/2016 | De Stefano | G06N 3/08 706/12 |

FOREIGN PATENT DOCUMENTS

| | | |
|---|---|---|
| WO | 2015187628 A2 | 12/2015 |
| WO | 2016154404 A1 | 9/2016 |

* cited by examiner

METHOD AND SYSTEM OF MAGNETOTELLURIC SYNCHRONOUS DETECTION AND REAL-TIME INVERSION

CROSS-REFERENCE TO RELATED APPLICATIONS

This application claims to Chinese Application No. 201711420785.8 with a filing date of Dec. 25, 2017. The content of the aforementioned applications, including any intervening amendments thereto, are incorporated herein by reference.

TECHNICAL FIELD

The invention relates to a geophysical prospecting method and system for magnetotelluric sounding, in particular to a method and system of magnetotelluric synchronous detection and real-time inversion.

BACKGROUND

The magnetotelluric (MT) is a geophysical exploration method for studying the electrical structure of underground geological bodies by monitoring the electrically induced electric and magnetic fields on the surface by using the natural alternating electromagnetic waves vertically incident at high altitude as the excitation source. As the magnetotelluric sounding has the advantages of no artificial source, less manual requirements, low operation cost, no shielding from the high resistance layer, sensitive to the low resistance layer, deep exploration, strong resolution ability and narrow equivalence range, it has been paid more attention and developed rapidly since it was proposed. Especially in recent years, with continuous updating of detection instruments and the use of electronic devices, some of complex and cumbersome detection equipment and operational problems have been solved and the magnetotelluric sounding is developed rapidly.

As a comprehensive geophysical exploration method, the magnetotelluric sounding has been successfully applied in survey of mineral resources and oil and gas resources, especially in places where real monitoring data is difficult to obtain by seismic exploration, such as earth's surface or shallow layer covered by thick rock (such as igneous rocks, thick sandstone, limestone and conglomerate). The magnetotelluric sounding can obtain better monitoring results than the other geophysical exploration methods. In the study of the geological structure of the crust and upper mantle, the magnetotelluric sounding can reach the exploration depth of 100~200 km. In the geodynamic program, it is crucial to study the internal temperature of the crust and upper mantle. Due to the geothermal measurement in mainland is limited by drilling, the temperature field characteristics are studied by using the resistivity parameters of the deep crust as the rock in the deep crust and upper mantle has semiconductor characteristics and its conductivity is exponentially related to the temperature. In the earthquake prediction, the resistivity of the source area will change greatly before the earthquake, and the phase angle between the impedance and the resistivity of deep formation will change significantly. According to the experimental results from the dilatancy theory, the resistivity of the source area before a great earthquake may be changed by about half. Therefore, the magnetotelluric sounding can be used to monitor the change in resistivity in the deep formation, so as to achieve the earthquake prediction. In groundwater search and shallow tectonic exploration, the detection depth is generally within 10 km, so the high frequency magnetotelluric sounding may be well suited. Herein, the magnetotelluric field source used is mainly the high frequency electromagnetic field transmitted by the electromagnetic wave along the resonant cavity between the earth and the atmosphere excited by the lightning effect near the equator.

To sum up, due to the advantages of the magnetotelluric sounding, it has been developed rapidly in recent years and is widely used in geophysical exploration operations. With further development and perfection of the magnetotelluric sounding, it has been developed comprehensively in the aspects of equipment acquiring signal, data processing, inversion interpretation and in-situ real-time inversion, which intends to infer more accurately the structure of underground geological bodies.

Currently, the technology of magnetotelluric sounding equipment in synchronous detection and real-time inversion has not been widely applied to actual detection work in domestic and overseas regions. Generally, only one equipment is used in the detection operation, and the detection of the measuring points is carried out individually. The detection lasts for a long period for a large detection area or a long measuring line. Even if the same equipment is used for online work, high equipment prices and complex online operations impedes synchronous detection. In terms of data inversion, it is operated through in-situ data acquisition and indoor data inversion. For a large number of monitoring data, it requires a long inversion time and in-situ monitor may not be guided.

SUMMARY

A method and system of magnetotelluric synchronous detection and real-time inversion is disclosed in the invention in order to overcome the above technical problems.

The technical solution of the invention includes a method and system of magnetotelluric synchronous detection and real-time inversion. The system includes a detection and inversion host (M) with wireless networking function and $N^2-1$ detection and inversion extensions ($S_i$) with wireless communication functions, the distance between each two detection and inversion extensions ($S_i$) is D, i=1, 2, . . . , $N^2-1$, and N is an odd number. The detection and inversion host is configured for detecting magnetic field signal in the area and collecting the electric field signal at measuring points, wireless networking and cooperation, and synchronous detection and real-time inversion control of the respective detection and inversion extensions ($S_i$). The detection and the inversion extensions ($S_i$), under cooperative control of the detection and inversion host, synchronously collect the electric field signal at the measuring points and invert the detection data at the measuring points in real-time. During detection, the detection and inversion host and the detection and inversion extensions ($S_i$) are arranged across $N^2$ measuring points in the detection area and the data at each measuring point is collected synchronously. The detection efficiency is increased by $N^2$ compared to single point detection, and the influence of the spatial and temporal variance in asynchronous detection on the inversion result is avoided. In the inversion, the detection and inversion extensions ($S_i$) at each measuring point carryout real-time inversion of the collected data under cooperative control of the detection and inversion host and return the inversion result to the detection and inversion host. It makes full use of the calculation ability of the detection and inversion host and the detection and inversion extensions ($S_i$), and it minimizes the data transmission volume and saves the inversion calculation time.

In the invention, the detection and inversion host adopts a DSP&CPLD centered structure, including a four-channel input protection circuit with an interface for X and Y-axis electric field sensors and an interface for X, Y, and Z-axis magnetic field sensors, a 4-channel low-frequency signal conditioning circuit and 4-channel low-speed ADC circuit for low frequency signal conditioning and acquisition, a 4-channel high-frequency signal conditioning circuit and a 4-channel high-speed ADC circuit for high-frequency signal conditioning and acquisition, a universal asynchronous transceiver UART for extending the wireless module and GPS module, a SDRAM chip for data caching, a FLASH chip for saving running program, a file management chip FMC for extending the USB interface and connecting to a built-in SD card, and the power conversion circuit that provides operating power supply for the detection and inversion host. The wireless module includes two communication modes, e.g., WIFI and RF, wherein WIFI is configured to connect to a host for synchronous detection and inversion parameter configuration for the system, and the RF is configured for communication with the detection and inversion extension ($S_i$) and the real-time control of system synchronous detection and inversion. The GPS module is configured for locating the geographical coordinates of the detection and inversion host and pulse-per-second synchronization with each detection and inversion extension ($S_i$) during synchronous detection. The built-in SD card is configured to store the real-time detection data and inversion results. The USB interface is an alternative interface for system synchronous detection and inversion parameter configuration, reading real-time detection data and inversion results. The detection and inversion host can simultaneously detect two electric field signals in X and Y directions and two magnetic field signals in X and Y directions, and configure the inversion parameters of each detection and inversion extension ($S_i$) and synchronously invert the detection data at the measuring points. When it is to detect three magnetic field signals in X, Y and Z directions, a further detection and inversion extension ($S_i$) is set up at the detection and inversion host to detect two electric field signals in X and Y directions.

In the invention, the detection and inversion extension ($S_i$) adopts a DSP&CPLD centered structure, including a two-channel input protection circuit with an interface for X and Y-axis electric field sensors, a 2-channel low-frequency signal conditioning circuit and 2-channel low-speed ADC circuit for low frequency signal conditioning acquisition, a 2-channel high-frequency signal conditioning circuit and a 2-channel high-speed ADC circuit for high-frequency signal conditioning acquisition, a universal asynchronous transceiver UART for extending wireless modules and GPS modules, a SDRAM chip for data caching, a FLASH chip for saving running program, a file management chip FMC for extending the USB interface and connecting to a built-in SD card, and a power conversion circuit that provides the operating power supply for the detection and inversion extension ($S_i$). The wireless module only has RF communication mode, which is configured for communication with the detection and inversion host and real-time control of synchronous detection and inversion for the system. The GPS module is configured for locating the geographical coordinates of the detection and inversion extension ($S_i$) and pulse-per-second synchronization with the detection and inversion host during synchronous detection. The built-in SD card is configured to store the real-time detection data and inversion results. The USB interface is an alternative interface for synchronous detection and inversion parameter configuration for the system, reading real-time detection data and inversion results. The detection and inversion extension ($S_i$) can simultaneously detect two electric field signals in X and Y directions and synchronously invert the detection data at measuring points in coordination with the detection and inversion host configuring the inversion parameters.

In the invention, the synchronous detection method includes dividing the detection area into N×N dot matrix, where N is an odd number. The measuring points are placed equidistantly. The communication distance between the center detection and inversion host and the detection inversion extension ($S_i$) at four vertices of the dot matrix is the same, and the maximum communication distance is 0.707 (N-1) times the spacing between two measuring points, which makes full use of effective distance of RF communication of the system to extend the N×N dot matrix or range of the detection area. The detection and inversion host and the detection and inversion extension ($S_i$) operate synchronously through the timing mechanism of the GPS module according to a configuration parameter file. Both the electromagnetic field signal monitored by the detection and inversion host and the electromagnetic field signal monitored by the detection and inversion extension ($S_i$) are the synchronous detection signal, which is not affected by the temporal and spatial factors, and the operating efficiency is increased by $N^2$ compared to single detection mode when $N^2$ devices are operating simultaneously.

In the invention, the real-time inversion method includes real-time processing of the collected data. When detecting low-frequency signals, the detection and inversion host and the detection and inversion extension ($S_i$) process the collected data during sampling intervals using cascading classification technology. When detecting high frequency signals, the collected signal is processed in real time after sampling. The process of real-time inversion includes data preprocessing, Fast Fourier transform, feature signal recognition, data interpretation and inversion, in which data interpretation and inversion is the process of impedance calculation, apparent resistivity solution and data inversion. The specific inversion algorithm can be selected according to configuration of the inversion parameters. When the real-time inversion terminates, each detection and inversion extension ($S_i$) will return the inversion result to the detection and inversion host through RF communication for image analysis of the host, which minimizes the data transmission volume of RF communication of the system, and the overall data processing time is shortened by $1/N^2$ compared to processing by single device.

The invention has the following advantages: the detection and inversion host and the detection and inversion extension ($S_i$) can detect and invert in real-time and synchronously. Through the communication in which the host regulates and the extensions ($S_i$) cooperate, in-situ detection can be conducted in real time. Operating efficiency can be improved while avoiding the spatiotemporal influence. The monitoring data quality can be improved. It can be widely applied to groundwater resources detection, mineral and oil and gas resources survey, crustal and upper mantle tectonic exploration, regional geological survey, and earthquake prediction and the like.

DETAILED DESCRIPTION OF EMBODIMENTS

The technical solutions of the present invention are clearly and completely described in the following according to the attached drawings. It is obvious that the described embodiments are only a part of the embodiments of the present invention, and not all embodiments. All other embodiments obtained by those skilled in the art based on the embodiments of the present invention without creative efforts are within the scope of the present invention.

Figure 1:
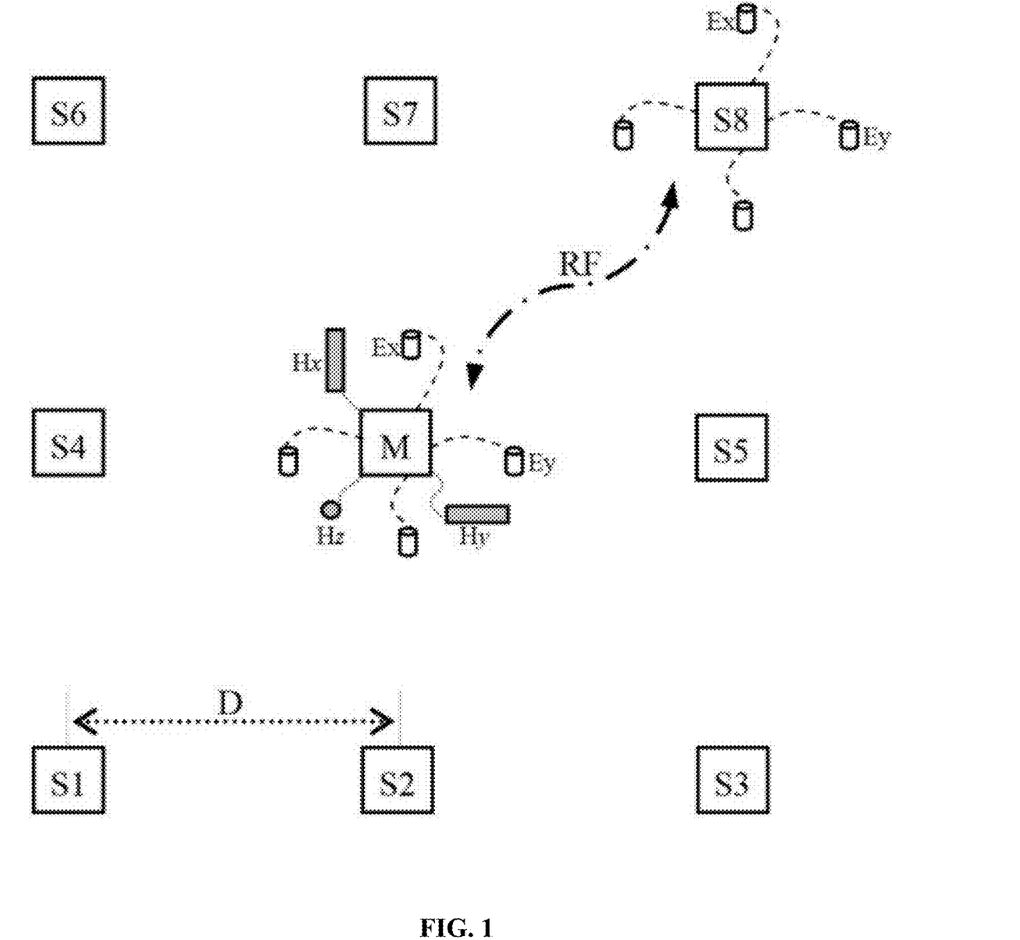
FIG. 1 is a block diagram of the system in which n=3, according to the embodiment of the invention.

Shown in FIG. 1, it is a block diagram of the system in which n=3 according the present invention. A method and system of magnetotelluric synchronous detection and real-time inversion system includes a detection and inversion host (M) with wireless networking function and $N^2$-1 detection and inversion extensions ($S_i$) with wireless communication functions, the distance between each two detection and inversion extensions ($S_i$) is D, i=1, 2, . . . , $N^2$-1, and N is an odd number. The detection and inversion host is configured for detecting magnetic field signal in the area and collecting the electric field signal at measuring points, wireless networking and cooperation, and synchronous detection and real-time inversion control of the respective detection and inversion extensions ($S_i$). The detection and the inversion extensions ($S_i$), under cooperative control of the detection and inversion host, synchronously collect the electric field signal at the measuring points and invert the detection data at the measuring points in real-time. During detection, the detection and inversion host and the detection and inversion extensions ($S_i$) are arranged across $N^2$ measuring points in the detection area and the data at each measuring point is collected synchronously. The detection efficiency is increased by $N^2$ compared to single point detection, and the influence of the spatial and temporal variance in asynchronous detection on the inversion result is avoided. In the inversion, the detection and inversion extensions ($S_i$) at each measuring points carryout real-time inversion of the collected data under cooperative control of the detection and inversion host and return the inversion result to the detection and inversion host. It makes full use of the calculation ability of the detection and inversion host and the detection and inversion extensions ($S_i$), and it minimizes the data transmission volume and saves the inversion calculation time. In FIG. 1, M represents the central detection and inversion host, and S1-S8 represents the detection and inversion extension ($S_i$). For the dividing of the measuring points in the detection area, it is implemented according to the detection requirements. In the case of general survey, the measuring points are placed sparsely, and in the case of detailed survey, the measuring points are placed densely. Ideally, the detection area in the invention is a square, and the number of rows or columns of the measuring points is an odd number, i.e., the detection electrodes at the measuring points are arranged in 9 dots, 25 dots, 49 dots and the like. In this case, the detection and inversion host is located in the center of the detection area, such regional coverage and detection can not only show the underground geological body within the entire area, but also in the effective communication distance of wireless communication, a maximum number of the measuring points are arranged. The detection with exploratory lines has no such advantages. In the in-situ detection, the detection and inversion host is placed in the center of the detection area, the electric field probe and the magnetic field sensor are connected to the detection and inversion host, and the detection and inversion extension ($S_i$) is placed at each measuring point in the divided area. In the process, according to the location information displayed by the human-machine interaction panel, the detection and inversion host and the detection and inversion extensions ($S_i$) are placed at the expected measuring points. The electric field probe should be in good contact with the soil, and the X and Y-axis magnetic field sensors should be placed horizontally with the help of horizontal ruler or horizontal instrument or the like. Z-axis magnetic field sensor is buried downwardly and vertically in the soil and the distance of the magnetic field sensor from the signal cable should be above 5 m. All signal cables should be fixed well, preferably on the ground, to avoid the situation such as signal cable shaking during the detection process. When all the preparation is completed, the detection and inversion host and each detection and inversion extension ($S_i$) are started. The host and extensions ($S_i$) enter the self-test state, and the self-test status information is stored in the memory of each device. When the self-test status of the extension ($S_i$) is good, a correct signal is feedback to the host, and when the self-test status of the extension ($S_i$) is erroneous, an error signal is feedback to the host. Finally, the host communicates with the human-computer interaction panel to display the status information of the device. When all the equipment can work properly, through the human-computer interaction panel configuration parameters are set and configuration parameter file is generated and uploaded to the host for saving. The host communicates with each extension ($S_i$) for transmission of configuration parameter file. When the process finishes, the host and extensions ($S_i$) will be operated to detect synchronously based on the configuration parameters file. When the synchronous detection task finishes, the host pre-processes the electric field signal Ex and Ey at its measuring point and the magnetic field signal Hx, Hy and Hz in the detection area, and spectrum information of the electric field and magnetic field is obtained and saved. The extension ($S_i$) pre-processes the collected electric field signal Ex and Ey, and spectrum information of the electric field is obtained and saved. The solution of the layered apparent resistivity at a single measuring point requires electric field and magnetic field information, and the extensions ($S_i$) of the detection device only collect electric field signal, so it is necessary for the host to transmit the spectrum information of the regional magnetic field signal to each extension ($S_i$). After the process finishes, the host and the extensions ($S_i$) synchronously calculate the apparent resistivity of the electromagnetic field signal spectrum. Then, inversion results on the entire spectrum information are obtained by inversion calculation according to the selected inversion algorithm. The host will gather and save the inversion results of each extension ($S_i$), obtain the inversion image of the whole detection area according to the resistivity imaging principle, and then select the inversion results of the monitored rows, columns or planes on the human-computer interaction panel. The inversion image is uploaded by the host to the human-computer interaction panel for display, which guides the in-situ detection. This operating manner increases the productivity by $N^2$, and shortens the data inversion time by $N^2$.

Figure 4:
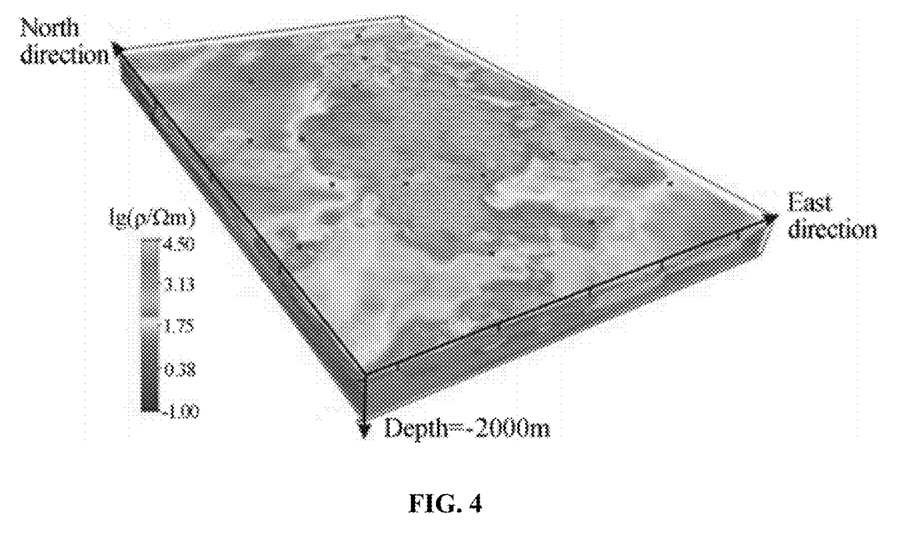
FIG. 4 is a three-dimensional inversion diagram of the detection area according to the embodiment of the present invention.

In FIG. 1, the communication between the host and the extension ($S_i$) uses RF monolithic radio frequency technology, by which the host controls the extensions ($S_i$) for data transmission in a coordinated manner. For example, the host communicates with the extension No. 1, and transmits the configuration parameter file to the extension No. 1, which returns a signal indicating successful receipt of the file upon receiving the file. The host and the extension No. 1 then communicate with the extension No. 2 and extension No. 3, respectively, and transmit the configuration parameter file to the extensions No. 2 and No. 3, which return a signal indicating successful receipt of the file upon receiving the file. Next, the host and the extensions No. 1, No. 2, and No. 3 communicate with the extensions No. 4, No. 5, No. 6 and No. 7, respectively and transmit the configuration parameter file. Upon a successful transmission, the host communicates with the extension No. 8. So far, all the transmission has finished. The transmission process is the same for 25 dots, 49 dots and the like. The process of each extension ($S_i$) communicating with the host is exactly opposite of the process as described above. Firstly, the inversion results of the extension No. 8 are sent to the host, and the extensions No. 4, No. 5, No. 6 and No. 7 respectively send their inversion results to the host and the extensions No. 1, No. 2 and No. 3. The extension No. 2 then sends the inversion results at the measuring points 2 and 6 to the host, and the extension No. 3 sends the inversion results at the measuring points 3 and 7 to the extension No. 1, and finally the extension No. 1 sends the inversion results at the measuring points 1, 3, 5 and 7 to the host. So far, the host gathers all the inversion results and generates images, as shown in FIG. 4. Such transmission increases the transmission efficiency by $$\frac{N^2 - 1}{2 \log_2^N + 1},$$

where N is the number of rows or columns of the matrix of measuring points in the area.

The synchronous detection method includes dividing the detection area into N×N dot matrix, where N is an odd number. The measuring points are placed equidistantly. The communication distance between the center detection and inversion host and the detection and inversion extension ($S_i$) at four vertices of the dot matrix is the same, and the maximum communication distance is 0.707 (N-1) times the spacing between two measuring points, which makes full use of effective distance of RF communication of the system to extend the N×N dot matrix or range of the detection area. The detection and inversion host and the detection and inversion extension ($S_i$) operate synchronously through the timing mechanism of the GPS module according to a configuration parameter file. Both the electromagnetic field signal monitored by the detection and inversion host and the electromagnetic field signal monitored by the detection and inversion extension ($S_i$) are the synchronous detection signal, which is not affected by the temporal and spatial factors, and the operating efficiency is increased by $N^2$ compared to single detection mode when $N^2$ devices are operating simultaneously. After completing the preliminary task such as measuring points arrangement and self-test, the detection and inversion host and the detection and inversion extensions ($S_i$) detect according to the monitoring frequency, detection start and end time or detection data length in the configuration parameter file. A GPS synchronous positioning module is provided inside the host and the extensions ($S_i$). A local constant temperature crystal phase locking GPS timing clock is used to realize the synchronization of the detection and inversion host and the detection and inversion extensions ($S_i$), wherein the time error of the synchronization is less than 20 ns. By means of the synchronous detection, the host and $N^2$-1 extensions ($S_i$) are operated, which increases the operation efficiency by $N^2$ compared to the original single point detection. There is no spatial-temporal variance in the electric field data acquired by the synchronous detection. The magnetic field signal used in data processing is acquired by monitoring of the detection and inversion host. All the measuring points use the same magnetic field signal. It lays a foundation for the accuracy of data processing and post-inversion interpretation.

The real-time inversion method includes real-time processing of the collected data. When detecting low-frequency signals, the detection and inversion host and the detection and inversion extension ($S_i$) process the collected data during sampling intervals using cascading classification technology. When detecting high frequency signals, the collected signal is processed in real time after sampling. The process of real-time inversion includes data preprocessing, Fast Fourier transform, feature signal recognition, data interpretation and inversion, in which data interpretation and inversion is the process of impedance calculation, apparent resistivity solution and data inversion. The specific inversion algorithm can be selected according to configuration of the inversion parameters. When the real-time inversion terminates, each detection and inversion extension ($S_i$) will return the inversion result to the detection and inversion host through RF communication for image analysis of the host, which minimizes the data transmission volume of RF communication of the system, and the overall data processing time is shortened by $1/N^2$ compared to processing by single device. During the detection at a very low frequency when the synchronous detection of the detection and inversion host and the detection and inversion extensions ($S_i$) is carried out or finished, the cascading classification technique is used to process the collected signal during the sample interval. For the detection of high frequency signal, the collected signal is processed in real time after sampling terminates. The process of real-time inversion includes data preprocessing, Fast Fourier transformation, feature signal recognition, data interpretation and inversion, in which data interpretation and inversion are the process of impedance calculation, apparent resistivity solution and data inversion. The specific inversion algorithm can be selected according to the configuration parameters. Due to the synchronous real-time inversion of $N^2$ detection and inversion equipments, their data processing time is shortened by $1/N^2$.

Figure 2:
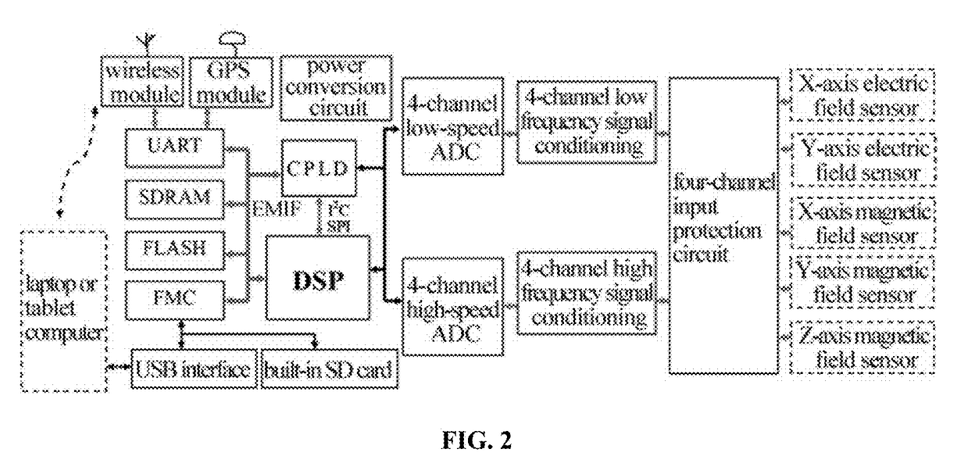
FIG. 2 is a block diagram of the internal circuit of the detection and inversion host according to the embodiment of the invention.

FIG. 2 is a block diagram of the internal circuit of the detection and inversion host according the embodiment of the invention. The detection and inversion host adopts a DSP&CPLD centered structure, including a four-channel input protection circuit with an interface for X and Y-axis electric field sensors and an interface for X, Y, and Z-axis magnetic field sensors, a 4-channel low-frequency signal conditioning circuit and 4-channel low-speed ADC circuit for low frequency signal conditioning and acquisition, a 4-channel high-frequency signal conditioning circuit and a 4-channel high-speed ADC circuit for high-frequency signal conditioning and acquisition, a universal asynchronous transceiver UART for extending the wireless module and GPS module, a SDRAM chip for data caching, a FLASH chip for saving running program, a file management chip FMC for extending the USB interface and connecting to a built-in SD card, and the power conversion circuit that provides operating power supply for the detection and inversion host. The wireless module includes two communication modes, e.g., WIFI and RF, wherein WIFI is configured to connect to a host for synchronous detection and inversion parameter configuration for the system, and the RF is configured for communication with the detection and inversion extension ($S_i$) and the real-time control of system synchronous detection and inversion. The GPS module is configured for locating the geographical coordinates of the detection and inversion host and pulse-per-second synchronization with each detection and inversion extension ($S_i$) during synchronous detection. The built-in SD card is configured to store the real-time detection data and inversion results. The USB interface is an alternative interface for system synchronous detection and inversion parameter configuration, reading real-time detection data and inversion results. The detection and inversion host can simultaneously detect two electric field signals in X and Y directions and two magnetic field signals in X and Y directions, and configure the inversion parameters of each detection and inversion extension ($S_i$) and synchronously invert the detection data at the measuring points. When it is to detect three magnetic field signals in X, Y and Z directions, a further detection and inversion extension ($S_i$) is set up at the detection and inversion host to detect two electric field signals in X and Y directions. The detection and inversion host is configured for synchronous detection and real-time inversion with the detection and inversion extensions ($S_i$). In addition, it is necessary for the detection and inversion host and the detection and inversion extensions ($S_i$) to cooperatively communicate. In the case of designing a minimal system centered with DSP&CPLD, the DSP should be selected such that it is capable of high-speed transmission and data processing, inversion image generation, etc. In this embodiment, the DSP is selected as TMS320C6726B in C67X series. The C67X series has a 32-bit floating-point DSP chip, with a speed of 1200~1800 MIPS, 900~1350MFLOPS, including TMS320C6726B, TMS320C6713, TMS320C6727, etc. TMS320C6726B has 32 KB program cache, 256 KB RAM, 384 KB ROM, a 16-bit EMIF, 2 SPI and I2C, and it fully meets the requirements of the invention for DSP. The CPLD (Complex Programmable Logic Devices) usually adopts the product-term structure to construct a logical behavior device, and it adopts an E²PROM or Flash memory for programming. In this embodiment, it mainly achieves the timing logic control of the respective module. The CPLD may be the product from Altera, Lattice, Xilinx, etc., such as Altera's MAX7000 series chips, Lattice's ispMACH4000 series chips and Xilinx's XC9500 series chips. In this embodiment, Lattice's ispMACH4128V is selected, which has 128 macro definitions, 64 I/O ports, highest frequency up to 333 MHz, transmission delay of 2.7 ns, 1.8V kernel power supply, and featured with high speed and low power consumption. The UART is a universal asynchronous transceiver, and this embodiment selects EXAR's ST16C2550, which is a dual-channel universal asynchronous receiving/sending device with a 16-bit FIFO interface, data frequency up to 1.5 Mbps, and configured to expand the GPS modules and wireless communication modules. Alternatively, TI's TL16C752, TL16C2550, and TL16C2552 series, and Maxim's MAX3000 series, etc. can be used. In this embodiment, the RF communication hardware in the wireless communication module uses an E50-TTL-500, which is a 170M direct-plug wireless serial port module, half duplex, transceiver integrated, ultra-low power consumption, and with a communication distance up to 5 Km. The WIFI communication hardware uses a ESP8266 centered communication module. In this embodiment, the GPS module uses Globalsat's BR-35354, with a USB interface, having a sensitivity of −163 dbm, positioning accuracy of less than 2.5 m, and synchronization time of 1 us. The SDRAM (Synchronous Dynamic Random Access Memory) chip adopts in this embodiment HY57V561620LT-HP from Hynix, which uses a 4Banks×4Mbits×16 structure, a LVTTL interface, with low power consumption, packed by 400 mil, 54-pin TSOP II. Alternatively, Samsung's K4S561632 series chips can be used. The Flash chip manufacturers mainly include Intel, SST, AMD, MXIC, etc. The FLASH used in this embodiment is the widely used 16M BYTE chip, such as Intel's 28F160C3, SST's 39VF160QNF160, AMD's 29LV160D, MXIC's 29LV160BT/BB, etc. This embodiment uses SST's 39VF160, which features single 2.7 V read-only and write operations, endurance of 100,000 cycles, more than 100 years data retention, fast read access time of 70-90 ns, packed by 48-Pin TSOP. The FMC (File Management Chip) uses in this embodiment WCH's CH378L chip, for fast reading and writing files in a USB disk or SD card, supporting USB connect mode and USB host mode, built-in with a basic firmware for USB communication protocol, a dedicated communication protocol firmware for processing Mass-Storage device, a communication interface firmware for SD card and a management firmware for FAT12, FAT16, FAT32 file system. They support commonly used USB storage device and SD card. In addition, TDI's TD242LP, Philips's ISP1761, Cypress's CY7C67200, etc. can also be used. Also, a built-in SD card in the detection and inversion host can be selected according to the actual detection workload.

Figure 3:
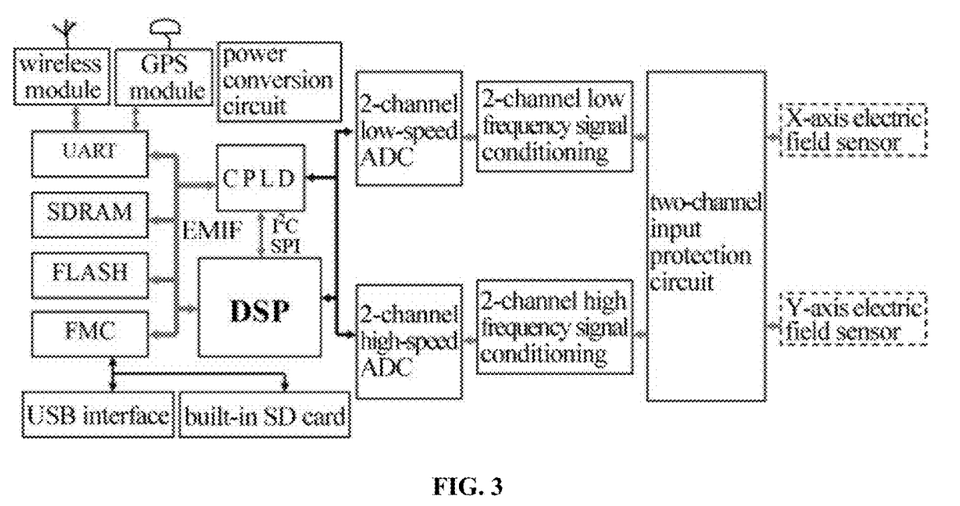
FIG. 3 is a block diagram of the internal circuit of the detection and inversion extension according to the embodiment of the invention.

FIG. 3 is a block diagram of the internal circuit of the detection and inversion extension ($S_i$) according to the embodiment of the invention. The detection and inversion extension ($S_i$) adopts a DSP&CPLD centered structure, including a two-channel input protection circuit with an interface for X and Y-axis electric field sensors, a 2-channel low-frequency signal conditioning circuit and 2-channel low-speed ADC circuit for low frequency signal conditioning acquisition, a 2-channel high-frequency signal conditioning circuit and a 2-channel high-speed ADC circuit for high-frequency signal conditioning acquisition, a universal asynchronous transceiver UART for extending wireless modules and GPS modules, a SDRAM chip for data caching, a FLASH chip for saving running program, a file management chip FMC for extending the USB interface and connecting to a built-in SD card, and a power conversion circuit that provides the operating power supply for the detection and inversion extension ($S_i$). The wireless module only has RF communication mode, which is configured for communication with the detection and inversion host and real-time control of synchronous detection and inversion for the system. The GPS module is configured for locating the geographical coordinates of the detection and inversion extension ($S_i$) and pulse-per-second synchronization with the detection and inversion host during synchronous detection. The built-in SD card is configured to store the real-time detection data and inversion results. The USB interface is an alternative interface for synchronous detection and inversion parameter configuration for the system, reading real-time detection data and inversion results. The detection and inversion extension ($S_i$) can simultaneously detect two electric field signals in X and Y directions and synchronously invert the detection data at measuring points in coordination with the detection and inversion host configuring the inversion parameters. The detection and inversion extension ($S_i$) and the detection and inversion host are configured for synchronous detection and real-time inversion. In addition, it is necessary for the detection and inversion extension ($S_i$) and the detection and inversion host to cooperatively communicate. In the case of designing a minimal system centered with DSP&CPLD, the DSP should be selected such that it is capable of high-speed transmission and data processing, inversion image generation, etc. In this embodiment, the DSP is selected as TMS320C6726B in C67X series. The C67X series has a 32-bit floating-point DSP chip, with a speed of 1200~1800 MIPS, 900~1350MFLOPS. TMS320C6726B has 32 KB program cache, 256 KB RAM, 384 KB ROM, a 16-bit EMIF, 2 SPI and I2C, and it fully meets the requirements of the invention for DSP. The CPLD (Complex Programmable Logic Devices) usually adopts the product-term structure to construct a logical behavior device, and it adopts an $E^2$PROM or Flash memory for programming. In this embodiment, Lattice's ispMACH4128V is selected, which has 128 macro definitions, 64 I/O ports, highest frequency up to 333 MHz, transmission delay of 2.7 ns, 1.8V kernel power supply, and featured with high speed and low power consumption. The UART is a universal asynchronous transceiver, and this embodiment selects EXAR's ST16C2550, which is a dual-channel universal asynchronous receiving/sending device with a 16-bit FIFO interface, data frequency up to 1.5 Mbps, and configured to expand the GPS modules and wireless communication modules. In this embodiment, the RF communication hardware in the wireless communication module uses an E50-TTL-500, which is a 170M direct-plug wireless serial port module, half duplex, transceiver integrated, ultra-low power consumption, and with a communication distance up to 5 Km. In this embodiment, the GPS module uses Globalsat's BR-353S4, with a USB interface, having a sensitivity of −163 dbm, positioning accuracy of less than 2.5 m, and synchronization time of 1 us. The SDRAM (Synchronous Dynamic Random Access Memory) chip adopts in this embodiment HY57V561620LT-HP from Hynix, which uses a 4 Banks×4Mbits×16 structure, a LVTTL interface, with low power consumption, packed by 400 mil, 54-pin TSOP II. The FLASH used in this embodiment is the widely used 16M BYTE chip. This embodiment uses SST's 39VF160, which features single 2.7 V read-only and write operations, endurance of 100,000 cycles, more than 100 years data retention, fast read access time of 70-90 ns, packed by 48-Pin TSOP. The FMC (File Management Chip) uses in this embodiment WCH's CH378L chip, for fast reading and writing files in a USB disk or SD card, supporting USB connect mode and USB host mode, built-in with a basic firmware for USB communication protocol, a dedicated communication protocol firmware for processing Mass-Storage device, a communication interface firmware for SD card and a management firmware for FAT12, FAT16, FAT32 file system. They support commonly used USB storage device and SD card. Also, the SD card in the detection and inversion extension ($S_i$) can be selected according to the actual detection workload.

To sum up, the invention includes a host for integrated detection of magnetotelluric and an extension ($S_i$) for integrated detection of magnetotelluric. It uses synchronous detection and real-time inversion, increases the operation efficiency by $N^2$, and shortens the data inversion time by $1/N^2$ compared to single device processing. The monitoring data is not affected by spatial and temporal factors. Through the communication in which the host regulates and the extensions ($S_i$) cooperate, the communication function of each detection device is fully utilized, and the transmission efficiency is increased by $$\frac{N^2-1}{2\log_2^N+1}.$$

The invention has the following advantages: the detection and inversion host and the detection and inversion extension ($S_i$) can detect and invert in real-time and synchronously. Through the communication in which the host regulates and the extensions ($S_i$) cooperate, in-situ detection can be conducted in real time. Operating efficiency can be improved while avoiding the spatiotemporal influence. The monitoring data quality can be improved. It can be widely applied to groundwater resources detection, mineral and oil and gas resources survey, crustal and upper mantle tectonic exploration, regional geological survey, and earthquake prediction and the like.

The above is only the preferred embodiment of the present invention, and is not intended to limit the present invention. Any modifications, equivalent substitutions, improvements, etc., which are within the spirit and scope of the present invention, should be within the protection scope of this invention.

What is claimed is:

1. A system of magnetotelluric synchronous detection and real-time inversion applicable in in-situ detection, wherein the system comprises:
    a host (M) with wireless networking function; and
    $N^2$-1 extensions ($S_i$) with wireless communication functions; a distance between each two extensions ($S_i$) is D, wherein i=1, 2, . . . , $N^2$-1, and N is an odd number greater than 1, wherein
    the host is configured for collecting magnetic field signals from the earth in a detection area and electric field signals from the earth at measuring points, wireless networking, synchronous detection and real-time inversion control of respective extensions ($S_i$); the extensions ($S_i$), under cooperative control of the host, is configured to synchronously collect electric field signals from the earth at the measuring points and invert detection data at the measuring points in real-time;
    the host is further configured to generate a geological image of the detection area based on the magnetic field signals and the electric field signals collected by the host and the extensions;
    during detection, the host and the extensions ($S_i$) are arranged across $N^2$ measuring points in the detection area and data at each measuring point is collected synchronously, detection efficiency is increased by $N^2$ compared to single point detection, and influence of a spatial and temporal variance in asynchronous detection on an inversion result is avoided; in inversion, the extensions ($S_i$) at each measuring points carryout real-time inversion of the collected data under cooperative control of the host, return the inversion result to the host, make full use of the calculation ability of the host and the extensions ($S_i$), minimize data transmission volume and saves inversion calculation time,
    wherein
    the host adopts a Digital Signal Processor (DSP) & Complex Programmable Logic Device (CPLD) centered structure, comprising:

a four-channel input protection circuit with an interface for X and Y-axis electric field sensors and an interface for X, Y, and Z-axis magnetic field sensors;

a 4-channel low-frequency signal conditioning circuit and 4-channel low-speed ADC circuit for low frequency signal conditioning and acquisition;

a 4-channel high-frequency signal conditioning circuit and a 4-channel high-speed ADC circuit for high-frequency signal conditioning and acquisition;

a universal asynchronous transceiver (UART) for extending a wireless chip and GPS chip;

a SDRAM chip for data caching;

a FLASH chip for saving running program;

a file management chip (FMC) for extending a USB interface and connecting to a built-in SD card; and a power conversion circuit that provides operating power supply for the host;

wherein the wireless chip comprises WIFI and RF communication modes; wherein the WIFI is configured to connect to the host for synchronous detection and inversion parameter configuration for the system, and the RF is configured for communication with the extension ($S_i$) and real-time control of system synchronous detection and inversion; the GPS chip is configured for locating geographical coordinates of the host and pulse-per-second synchronization with each extension ($S_i$) during synchronous detection; the built-in SD card is configured to store real-time detection data and inversion results; the USB interface is an alternative interface for system synchronous detection and the inversion parameter configuration, reading the real-time detection data and inversion results; the host is configured to simultaneously detect two electric field signals in X and Y directions and two magnetic field signals in X and Y directions, configure inversion parameters of each extension ($S_i$), and synchronously invert the detection data at the measuring points; when detecting three magnetic field signals in X, Y and Z directions, a further extension ($S_i$) is set up at the host to detect the two electric field signals in X and Y directions.

2. The system of the magnetotelluric synchronous detection and the real-time inversion of claim 1, wherein the extension ($S_i$) adopts the DSP&CPLD centered structure, comprising:

a two-channel input protection circuit with an interface for the X and Y-axis electric field sensors;

a 2-channel low-frequency signal conditioning circuit and 2-channel low-speed ADC circuit for low frequency signal conditioning acquisition;

a 2-channel high-frequency signal conditioning circuit and a 2-channel high-speed ADC circuit for high-frequency signal conditioning acquisition;

a universal asynchronous transceiver (UART) for extending wireless chips and the GPS chips;

a the SDRAM chip for data caching;

a the FLASH chip for saving running program;

the file management chip (FMC) for extending the USB interface and connecting to a built-in SD card; and a power conversion circuit that provides an operating power supply for the extension ($S_i$)

wherein the wireless chip only has RF communication mode, which is configured for communication with the host and the real-time control of synchronous detection and inversion for the system;

the GPS chip is configured for locating the geographical coordinates of the extension ($S_i$) and pulse-per-second synchronization with the host during synchronous detection;

the built-in SD card is configured to store the real-time detection data and inversion results;

the USB interface is an alternative interface for synchronous detection and the inversion parameter configuration for the system, reading the real-time detection data and inversion results;

the extension ($S_i$) is configured to simultaneously detect the two electric field signals in X and Y directions and synchronously invert the detection data at the measuring points in coordination with the host configuring the inversion parameters.

3. The system of the magnetotelluric synchronous detection and the real-time inversion of claim 1, wherein the detection area is divided into N×N dot matrix, wherein N is an odd number, and a distance between each two measuring points is D; the host is at an equal communication distance with each of the extensions ($S_i$) at four vertices of the dot matrix, and a maximum communication distance is 0.707*(N-1)*D; the host and the extension ($S_i$) operate synchronously through a timing mechanism of the GPS chip according to a configuration parameter file, both the electromagnetic field signal monitored by the host and the electromagnetic field signal monitored by the extension ($S_i$) are the synchronous detection signal, which is not affected by temporal and spatial factors, and operating efficiency is increased by $N^2$ compared to single detection mode when $N^2$ devices are operating simultaneously.

4. The system of the magnetotelluric synchronous detection and the real-time inversion of claim 1, wherein the real-time inversion comprises real-time processing of the collected data; the host and the extension ($S_i$) is configured to process the collected data during sampling intervals using cascading classification technology when detecting low-frequency signals; the collected signal is processed in real time after sampling when detecting high frequency signals; the process of real-time inversion comprises:

data preprocessing;

fast fourier transform;

feature signal recognition; and data interpretation and inversion;

wherein data interpretation and inversion is the process of impedance calculation, apparent resistivity solution and data inversion, and a specific inversion algorithm is selected according to configuration of inversion parameters; when the real-time inversion terminates, each extension ($S_i$) returns the inversion result to the host through RF communication for image analysis of the host, which minimizes data transmission volume of RF communication of the system, and overall data processing time is shortened by $1/N^2$ compared to processing by single device.

* * * * *